Figure 1:
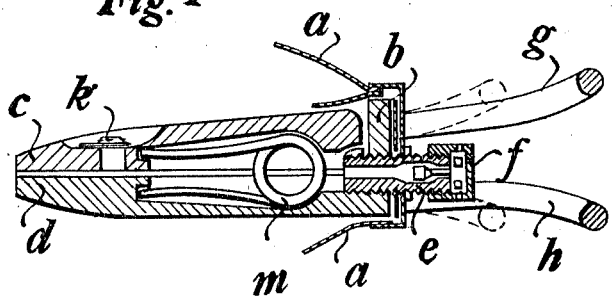

C. ANDRESEN, GEB. CLAUSEN.
DEVICE FOR INFLATING CUSHIONS FOR INVALIDS' BEDS, CHAIRS, OR THE LIKE.
APPLICATION FILED AUG. 26, 1913.

1,099,144.

Patented June 2, 1914.

Witnesses:
C. D. Swett
G. M. Copenhaver

Inventor:
Catharina Andresen
by F. Dittmar
Attorney

UNITED STATES PATENT OFFICE.

CATHARINA ANDRESEN, GEB. CLAUSEN, OF BUSCHAU, NEAR SCHLESWIG, GERMANY.

DEVICE FOR INFLATING CUSHIONS FOR INVALIDS' BEDS, CHAIRS, OR THE LIKE.

1,099,144. Specification of Letters Patent. Patented June 2, 1914.

Application filed August 26, 1913. Serial No. 786,804.

*To all whom it may concern:*

Be it known that I, CATHARINA ANDRESEN, born CLAUSEN, subject of the German Emperor, residing at Buschau, near Schleswig, Germany, have invented certain new and useful Improvements in Devices for Inflating Cushions for Invalids' Beds, Chairs, or the like, of which the following is a specification, reference being had thereto in the accompanying drawing.

The drawing shows an example of object of my invention.

Figure 2:
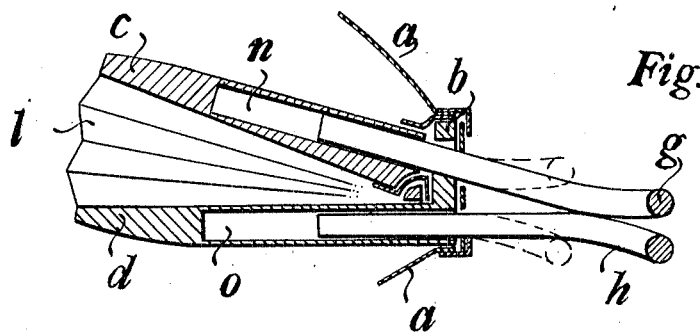
Figure 3:
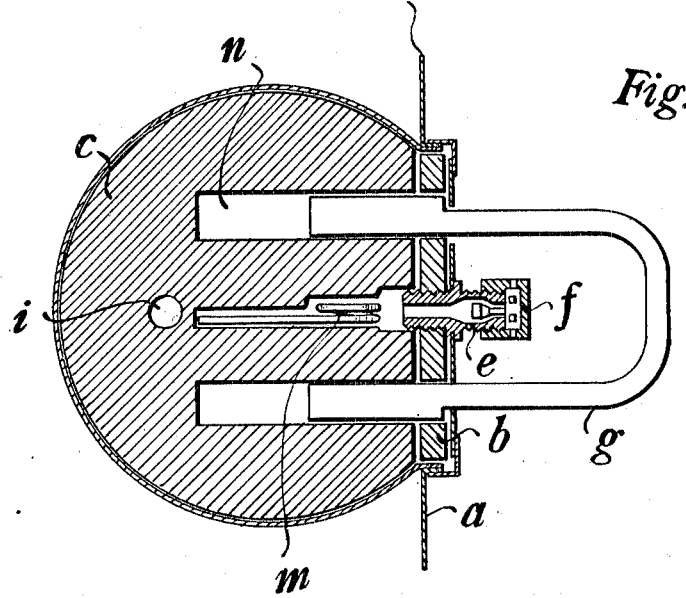

Figure 1 shows vertical section through cushion, Fig. 2 vertical section through bail, and Fig. 3 horizontal section through both valves and the bail with cheeks.

On the air cushion $a$ is placed the mouthpiece $b$ with the two cheeks $c$ and $d$ and the in-suction valve $e$ with the fastening nut $f$. In the two cheeks $c$ and $d$ there are for each bail $g$ and $h$ two perforations $n$ and $o$, so that these bails, according as they are to be used or not, can be pulled out farther or shoved in deeper; Figs. 1 and 2 show these bails pulled out, while in the same figures the bails are shown shoved in in dotted lines. Through the upper cheek $c$ there passes the opening $i$, which is closed by the valve $k$. Between the two cheeks $c$ and $d$ is the bellows $l$. For pulling the two cheeks together there is applied the spring $m$ in the interior of the bellows. If the air cushion is to be inflated, the two bails $g$ and $h$ are pulled out, the lid $f$ of the valve $e$ is loosened and then the two cheeks $g$ and $h$ are pressed together (see Fig. 2) thereby the two cheeks move apart, the bellows stretches and through the valve $e$ the hollow space resulting becomes filled with air. Hereupon the two bails are released and the spring $m$ pulls the two cheeks together, whereby the air escapes through the valve $k$ into the air cushion. This operation is repeated until the cushion is sufficiently filled with air and then the lid $f$ is turned fast. Then the two bails are pushed back again. If it is desired to remove the air from the cushion, the outlet valve at a suitable point is unscrewed.

Having now described my invention and the manner of using it, what I claim and desire to secure is:—

1. In a device for inflating air cushions, the combination of a mouth piece two cheeks connected at one side to said mouthpiece and having sockets thereon, bails at each side of said mouthpiece and extending into said sockets, and longitudinally movable therein and a flexible wall between said cheeks operated by said bails.

2. In a device for inflating air cushions, the combination of a mouthpiece having an inlet valve, two cheeks connected at one side to said mouthpiece and having sockets therein, bails at each side of said mouthpiece and extending into said socket and longitudinally movable therein—bellows in said cheeks operated by said bails and a spring in said bellows to normally hold said bellows in a closed position.

3. In an air cushion inflating device the combination of a mouthpiece, a valve therein, bails supported by said mouthpiece and longitudinally adjustable therein, a bellows connected with said mouthpiece and held normally closed by a spring and valves adapted to admit air into said bellows when the bails are compressed and to admit the air from said bellows into the cushions when the bails are released.

4. In an air cushion inflating device, the combination of a bellows, bails thereon adapted to be longitudinally adjusted, and operating when open to expand said bellows, and a spring in said bellows operating to close the latter and to open said bails and valves whereby air is admitted into said bellows and forced into said cushion as specified.

In testimony whereof I affix my signature in the presence of two witnesses.

CATHARINA ANDRESEN, GEB. CLAUSEN.

Witnesses:
 JULIUS RÖPKE,
 KARL FRIEDRICH FUNTZEL.

Copies of this patent may be obtained for five cents each, by addressing the "Commissioner of Patents, Washington, D. C."